US012798524B2

(12) United States Patent
Jo

(10) Patent No.: US 12,798,524 B2
(45) Date of Patent: Nov. 17, 2026

(54) BRAKE DEVICE AND VEHICLE INCLUDING THE SAME

(71) Applicant: HYUNDAI MOBIS CO., LTD., Seoul (KR)

(72) Inventor: Chi Hoon Jo, Gwangmyeong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 385 days.

(21) Appl. No.: 18/525,064

(22) Filed: Nov. 30, 2023

(65) Prior Publication Data

US 2024/0400010 A1 Dec. 5, 2024

(30) Foreign Application Priority Data

May 30, 2023 (KR) ........................ 10-2023-0069290

(51) Int. Cl.

| | |
|---|---|
| ***B60T 1/06*** | (2006.01) |
| ***B60T 11/16*** | (2006.01) |
| ***F16D 55/22*** | (2006.01) |
| ***F16D 65/18*** | (2006.01) |

(52) U.S. Cl.

CPC ............... *B60T 1/06* (2013.01); *B60T 11/165* (2013.01); *B60T 2201/10* (2013.01)

(58) Field of Classification Search

CPC .... F16D 65/18; F16D 55/226; F16D 65/0068; F16D 2055/0016; F16D 2121/24; F16D 2125/40; B60T 1/06; B60T 11/165; B60T 2201/10; B60T 1/065

See application file for complete search history.

(56) References Cited

U.S. PATENT DOCUMENTS

| | | | | | |
|---|---|---|---|---|---|
| 4,031,986 | A * | 6/1977 | Thompson | B60T 1/065 188/73.31 |
| 4,602,702 | A * | 7/1986 | Ohta | B60T 8/326 188/106 P |
| 4,679,668 | A * | 7/1987 | Washizu | B60T 8/52 477/194 |
| 5,090,518 | A * | 2/1992 | Schenk | B60T 8/00 188/72.1 |
| 7,455,152 | B2 * | 11/2008 | Wang | F16D 55/225 188/106 P |
| 9,272,695 | B2 * | 3/2016 | Liao | F16D 55/226 |
| 9,422,991 | B2 * | 8/2016 | Nessi | F16D 55/226 |
| 9,777,782 | B2 * | 10/2017 | De Morais | F16D 55/226 |
| 10,119,582 | B2 * | 11/2018 | Noguchi | F16D 55/226 |
| 11,125,288 | B2 * | 9/2021 | Bahmata | F16D 65/0068 |
| 11,453,459 | B2 * | 9/2022 | Ruopp | F16D 65/18 |
| 11,655,867 | B2 * | 5/2023 | Lou | F16D 65/183 188/72.4 |
| 11,772,623 | B2 * | 10/2023 | Ahn | B60T 8/17 303/6.01 |
| 11,866,022 | B2 * | 1/2024 | Cheon | B60T 8/885 |
| 2002/0007989 | A1 * | 1/2002 | Matsuishi | F16D 55/228 188/73.31 |

(Continued)

*Primary Examiner* — Robert A. Siconolfi
*Assistant Examiner* — James K Hsiao
(74) *Attorney, Agent, or Firm* — Novo TechIP International PLLC

(57) ABSTRACT

A brake device prepares for a failure of a parking brake as an opposed brake device integrated with an electronic parking brake effectively prevents rotation of the piston shaft when the parking piston is driven.

10 Claims, 10 Drawing Sheets

(56) References Cited

U.S. PATENT DOCUMENTS

| | | | | |
|---|---|---|---|---|
| 2005/0000757 | A1* | 1/2005 | Wang | F16D 55/225 188/71.1 |
| 2010/0032250 | A1* | 2/2010 | Cantoni | F16D 55/2262 188/72.3 |
| 2015/0001010 | A1* | 1/2015 | Liao | F16D 65/18 188/72.3 |
| 2015/0021125 | A1* | 1/2015 | Nessi | F16D 55/228 188/72.5 |
| 2015/0300433 | A1* | 10/2015 | Yasui | B60T 13/741 188/162 |
| 2016/0131207 | A1* | 5/2016 | Morais | F16D 55/226 188/73.45 |
| 2018/0058524 | A1* | 3/2018 | Suzuki | F16D 65/183 |
| 2019/0383336 | A1* | 12/2019 | Noguchi | F16D 55/226 |
| 2022/0212644 | A1* | 7/2022 | Wang | F16D 55/2265 |

* cited by examiner (a)

(b)

BRAKE DEVICE AND VEHICLE INCLUDING THE SAME

CROSS-REFERENCE TO RELATED APPLICATIONS

Pursuant to 35 U.S.C. § 119(a), this application claims the benefit of Korean Patent Application No. 10-2023-0069290, filed on May 30, 2023, which is hereby incorporated by reference as if fully set forth herein.

TECHNICAL FIELD

The present embodiments relate to a brake device applicable to a vehicle and a vehicle including the same, and more particularly, to a brake device in which an opposed brake device integrated with an electronic parking brake prevents rotation of a piston shaft when a parking piston is driven, and a vehicle including the brake device.

BACKGROUND

A brake device mounted in a vehicle is a device for decelerating, stopping, or maintaining a stopped state of a vehicle while driving and is located inside a rotating wheel, and brakes a vehicle by strongly pressing a disc-shaped brake disc rotating together with the wheel using brake pads from both sides.

In a conventional brake device, two brake pads disposed on both sides of a disc are supported to move forward or backward on an accommodation surface of a caliper body fixed to a vehicle. A pad support pin for guiding forward or backward movement of the brake pads, and a spring member for elastically supporting upper parts of two pad plates to prevent vibration of the pad plates and achieving a smooth return operation are installed.

The brake device may be largely divided into a drum-type brake device and a disc-type brake device. The drum-type brake device uses a method of stopping using a shoe in contact with an inner surface of a cylindrical drum, and the disc-type brake device stops the brake pad by contacting a surface of the brake disc rotating together with the wheel. The disc-type brake device has a caliper that is a housing in which the brake pad is located and is coupled to the wheel, and has a simpler structure and a smaller volume than the drum-type brake device and thus is applied to passenger cars. Only one of the two types may be used or the disc-type brake device and the drum-type brake device may be applied the front and to the rear, respectively.

The disc type may be classified into a fixed opposed caliper and a sliding caliper.

The opposed caliper uses a method in which a caliper body is in contact with a brake disc by pressing the brake pad from both sides while being fixed. This method is efficient in that the opposed caliper has a symmetrical structure and has excellent braking force, but in this case, a volume increases because pistons for applying pressure from both sides need to be located on both sides.

The sliding caliper includes a piston pressing only a brake pad at one side and has a structure in which the caliper body slides and brakes by a reaction that pushes the disc. Since the piston is provided on only one side, it is easy to implement the piston and prevents the structure of the caliper from becoming enlarged, and advantageously, there is no need to adjust a speed of the pistons on both sides equally.

In the former case, the brake disc is always fixed at the center of the caliper, but in the latter case, the position of the caliper is slidably coupled on the brake disc.

The vehicle may include a parking brake in addition to the main braking brake. The parking brake is not a brake for braking while driving, but a brake to fix a parked state. In a traditional parking brake, a rear wheel is held with a cable to fix wheels by pulling a lever located on a side of a driver seat. The parking brake has evolved from a hand-operated side lever type to a foot parking brake type operated by foot.

A brake of a passenger vehicle that is recently released is also called an electric parking brake (EPB) as an electronic parking brake. The electronic parking brake may be operated simply with a button, and rotation of the disc is limited by pressing the brake disc using a motor, not a wire.

The electronic parking brake includes one gear and one screw rotated by a motor, and may be installed inside the brake disc. The electronic parking brake uses a parking brake method that is applied to recently released high-end vehicles because the electronic parking brake is conveniently manipulated and uses an auto hold function.

However, in the case of an opposed type brake disc, since the main braking caliper is fixed, the parking brake needs to also be pressed simultaneously from both sides of the brake disc, but it is difficult to place the motor, gear, and piston on both sides of the main braking system, and accordingly, there is a problem that the electronic parking brake needs to be separately provided from the main braking brake.

In addition, because the parking brake is separated from the brake disc during the braking of the vehicle, a bolt is fastened to control rotation of the screw. The control of the rotation of the screw via the bolt causes a deformation of the bolt, causing a failure of the parking brake.

SUMMARY

The present disclosure provides a brake device and a vehicle including the same, and more particularly, a brake device in which an opposed brake device integrated with an electronic parking brake prevents rotation of a piston shaft when a parking piston is driven, and a vehicle including the same.

Problems to be solved in the present disclosure are not limited to the problems mentioned above, and other problems not mentioned may be clearly understood by those skilled in the art in the technical field to which the present disclosure belongs from the description below.

Provided is a brake device including a main braking caliper body, a brake pad including a first brake pad and a second brake pad disposed on one side and the other side of the main braking caliper body such that first surfaces thereof face each other, a parking caliper body coupled to the main braking caliper body and including a locking part engaged with a second surface of the first brake pad, and a parking piston mounted in the parking caliper body and pressurizing a second surface of the second brake pad, wherein the parking piston includes a piston shaft that moves forward toward or backward away from the second brake pad, and a guide pin protruding and coupled to a top surface of the piston shaft.

The parking caliper body may include a rotation preventing groove that receives the guide pin inserted thereinto and prevents rotation of the piston shaft when the parking piston is driven.

The brake device may further include a guide plate coupled to the parking caliper body and guiding the forward or backward movement of the piston shaft.

The locking part of the parking caliper body may move the first brake pad toward the second brake pad when the parking piston pressurizes the second brake pad.

An extension length of the parking piston may correspond to a sum of a movement distance of the second brake pad and a movement distance of the parking caliper body.

The main braking caliper body may include a first accommodation part located in a direction of the second surface of the first brake pad, wherein the locking part of the parking caliper body is inserted into the first accommodation part, and a second accommodation part located in a direction of the second surface of the second brake pad and where the parking piston is located.

The main braking caliper body may have an open top surface to expose an upper portion of the brake pad, and the parking caliper body may include an upper portion covering at least a portion of the open top surface of the main braking caliper body and connecting the locking part and the parking piston to each other.

The main braking caliper body may include a guide hole extending in a direction parallel to a moving direction of the parking piston, the parking caliper body may include a guide rod inserted into the guide hole, and the guide rod may slide along the guide hole when the parking piston is driven.

Provided is a vehicle including a vehicle body, a wheel located beneath the vehicle body and rotating, a brake disc coupled to the wheel and rotating together with the wheel, a main braking caliper body, wherein one end of the brake disc is inserted into the main braking caliper body, a brake pad including a first brake pad and a second brake pad disposed on one side and the other side of the main braking caliper body such that first surfaces thereof face the brake disc, a parking caliper body coupled to the main braking caliper body and including a locking part engaged with a second surface of the first brake pad, and a parking piston mounted in the parking caliper body and pressurizing a second surface of the second brake pad, wherein the parking piston includes a piston shaft that moves forward toward or backward away from the second brake pad, and a guide pin protruding and coupled to a top surface of the piston shaft.

The parking caliper body may include a rotation preventing groove that receives the guide pin inserted thereinto and prevents rotation of the piston shaft when the parking piston is driven.

The brake device and the vehicle including the same according to the present disclosure may prepare for the failure of the parking brake as the opposed brake device integrated with the electronic parking brake effectively prevents the rotation of the piston shaft when the parking piston is driven.

In addition, as the main braking caliper body is used as the torque member of the parking caliper body, the parking caliper body may be slidable, and the main braking brake and the parking brake may be easily assembled with and disassembled from each other.

Effects that may be obtained from the present disclosure may not be limited to the effects mentioned above, and other effects not mentioned may be clearly understood by those skilled in the art in the technical field to which the present disclosure belongs from the description below.

DETAILED DESCRIPTION

Figure 1:
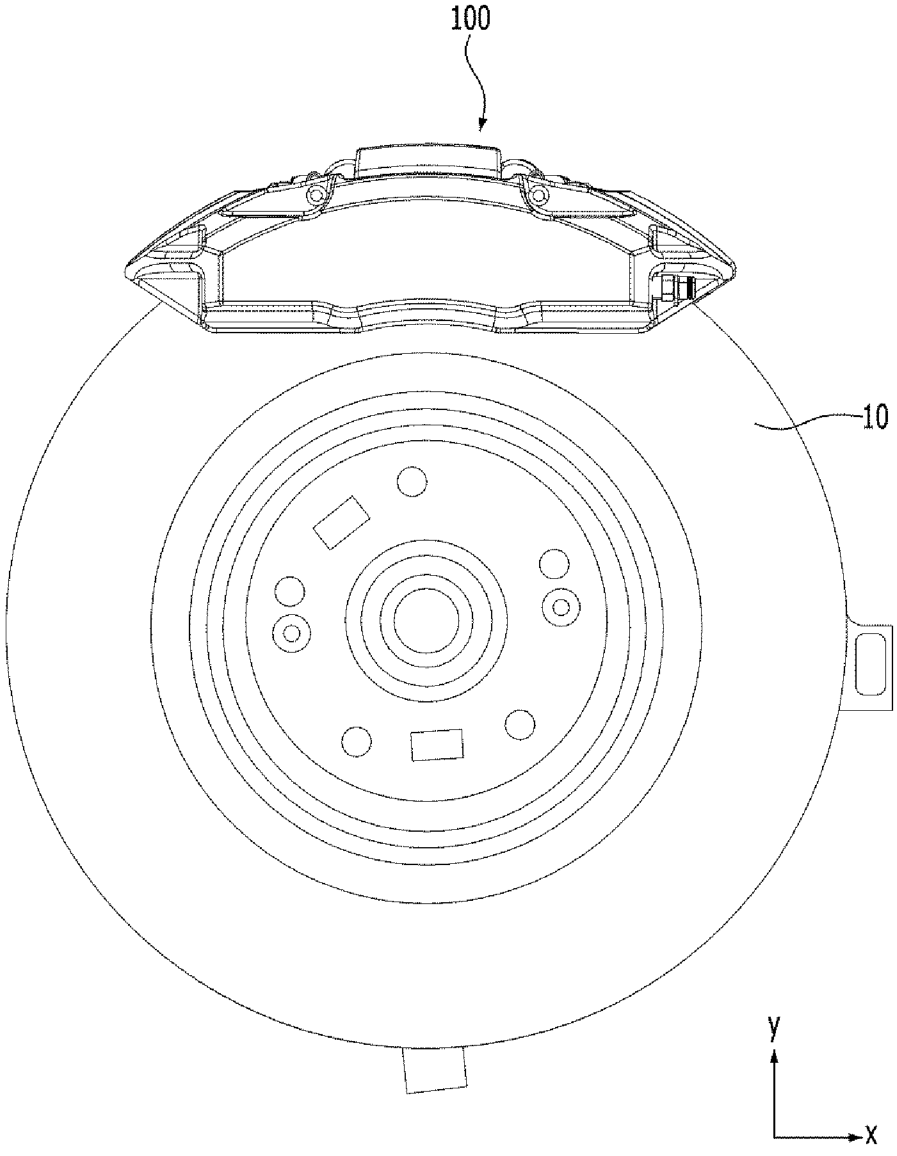
FIG. 1 is a front view of a brake device and a brake disc according to any one of embodiments of the present disclosure.

Hereinafter, the present disclosure will be described more fully with reference to the accompanying drawings, in which exemplary embodiments of the present disclosure are shown. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art.

Terms used in this disclosure are used to describe specified embodiments and are not intended to limit the scope of another embodiment. The terms of a singular form may include plural forms unless otherwise specified. As used herein, "comprises" and/or "comprising" does not exclude the presence or addition of one or more other components in addition to the stated components. Like reference numerals refer to like elements throughout, and "and/or" includes each and every combination of one or more of the recited elements. Although "first", "second", etc. are used to describe various elements, these elements are not limited by these terms, needless to say. These terms are only used to distinguish one component from another. Therefore, needless to say, the first component mentioned below may be the second component within the spirit of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms "below", "beneath", "lower", "above", "upper", etc. may be used to easily describe a correlation between one component and other components. A spatially relative term needs to be understood as a term that includes different directions of components during use or operation in addition to directions shown in the drawings. For example, when a component shown in the drawing is turned over, a component described as "beneath" or "beneath" of another component may be placed "above" of the other component. Accordingly, the exemplary term "below" may include both directions below and above. Components may also be oriented in other orientations, and thus spatially relative terms may be interpreted according to orientation.

Figure 2:
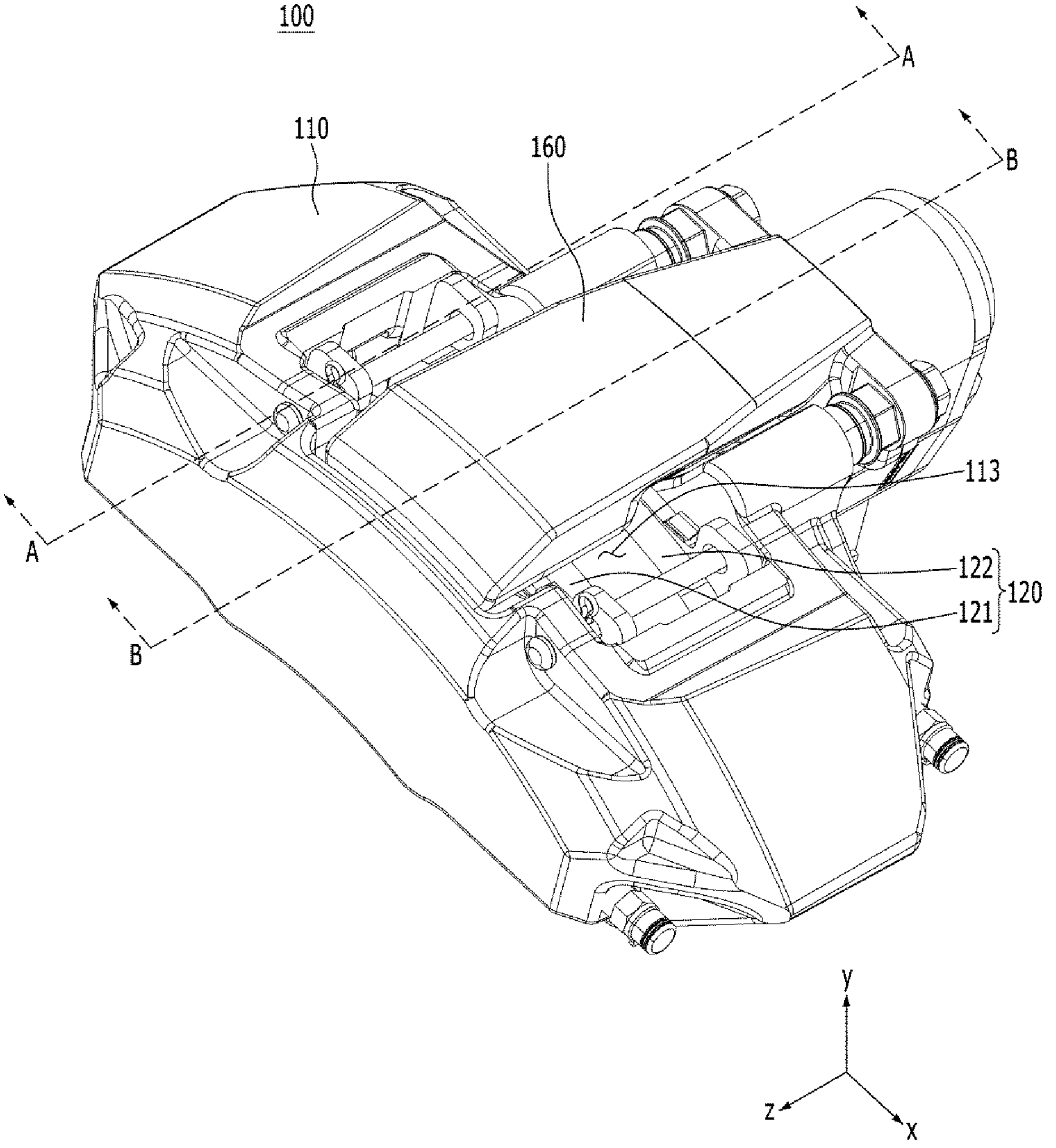
FIG. 2 is a perspective view of a brake device according to any one of embodiments of the present disclosure.

FIG. 1 is a front view of a brake device 100 and a brake disc 10 according to any one of embodiments of the present disclosure. FIG. 2 is a perspective view of a brake device 100 according to any one of embodiments of the present disclosure. Hereinafter, in describing the brake device 100, a reference of the up-down (y-axis) and left-right (x-axis) directions, and front and rear (z-axis) directions may be based on the brake device 100 illustrated in FIG. 1.

Wheels of the vehicle may be generally disposed on both left and right sides, and a front direction shown in FIG. 1 may be disposed to face the outside of the vehicle. Depending on a type of the brake device 100, front and rear shapes may have a symmetrical shape (opposed caliper brake), or a piston structure may be provided at only one side (sliding caliper brake).

The opposed caliper brake may use a method in which a brake pad part 120 is pressed from both sides to come in contact with the brake disc 10 in the state in which a main braking caliper body 110 is fixed. This method has excellent braking power in terms of a symmetrical structure, but since pistons for pressurization from both sides need to be disposed at or located on both sides, the volume of an outer part of a wheel may increase and piston speeds on both sides need to be synchronized.

The sliding caliper may include a piston that presses only the brake pad 12 at one side and has a structure in which the main braking caliper body 110 slides and brakes by a reaction that pushes the brake disc with the brake pad at one side.

Since the main braking piston is provided on only one side, it is easy to implement the device, and there is an advantage that it is not necessary to adjust speeds of the pistons at both sides equally. However, braking force is inferior to the opposed caliper brake, and an opposed caliper brake system is introduced for high-end vehicles.

In the opposed caliper brake, the brake disc is always located at the center of the caliper body, but in the slide caliper brake, the position of the caliper body is slidably coupled to the brake disc.

Referring to FIG. 1, the brake device 100 may apply braking to the wheel of the vehicle by pressing a surface of the brake disc 10. The brake disc 10 and a knuckle assembly may be components connected to the wheels of the vehicle.

The brake disc 10 may rotate with rotation of the wheels while the vehicle drives. When the brake device 100 applies pressure to the brake disc 10, resistance may be generated to rotation of the brake disc 10, thereby reducing rotational speed of the wheel. That is, the vehicle may brake.

Figure 3:
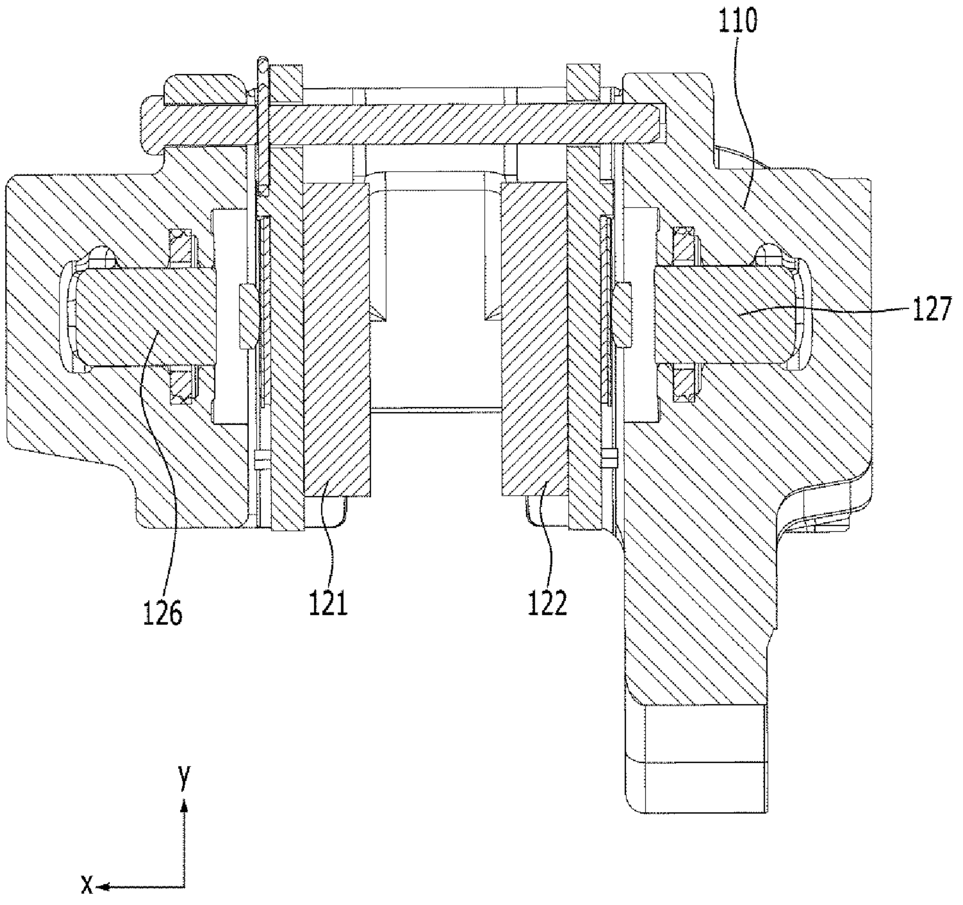
FIG. 3 is a cross-sectional view taken along A-A of FIG. 2.

FIG. 2 is a perspective view of the brake device 100 according to any one of embodiments of the present disclosure. FIG. 3 is a cross-sectional view taken along A-A of FIG. 2.

The brake device 100 according to the present disclosure may include the main braking caliper body 110 into which one side of the brake disc 10 is inserted and one pair of brake pads 120 disposed or mounted on the main braking caliper body 110 to face both surfaces of the brake disc 10.

The brake device 100 according to the present disclosure may be an opposed caliper brake device 100, in which the brake discs 10 on both sides move simultaneously and are pressed, and the positions of the main braking caliper bodies 110 with respect to the brake disc 10 may correspond to each other in a direction in which the brake pad part 120 moves.

One pair of brake pads 120 may be disposed to allow first surfaces as friction surfaces to face each other, and one side of the brake disc 10 may be inserted into a space 113 between one pair of brake pads 121 and 122.

The opposed caliper brake may be symmetrical left and right and may have the same structure in the inside and the outside of the wheel, but the brake device 100 according to the present disclosure may have an integrated-type parking brake 160 in which only a parking piston 164 is located only at one side.

The parking brake 160 may be a device for fixing the wheel to prevent a vehicle from pushing during parking and may be distinguished from a main braking brake 150 that reduces a rotational speed of the wheel using friction.

The main braking brake 150 may reduce a speed of the wheel using friction, but the parking brake 160 may limit rotation of the wheel using a separate cable or linkage. Conventionally, a mechanical method is mainly used, but recently, an Electronic Parking Break (EPB) using a motor has been mainly applied to a vehicle.

The conventional parking brake uses a drum type, but recently, the parking brake 160 may also be implemented using the brake disc 10 of the main braking brake 150.

By introducing the electronic parking brake 160, the parking brake 160 may automatically operate when stopped without a separate operation, and a stop and go function that releases the parking brake 160 when starting again may be mounted on the vehicle to enlarge a function of the vehicle.

The electronic parking brake 160 may include the parking piston 164 for pressing the brake disc 10 using a parking motor and a plurality of pinion gears 163 for transmitting power between the parking motor and the parking piston 164.

The parking brake 160 may be separately provided from the main braking brake 150, and a parking caliper body 161 including the parking piston 164 pressurizing the brake disc 10 may be coupled to the brake disc 10 separately from the main braking brake 150. As such, a form in which the main braking brake 150 and the parking brake 160 are provided independently may use a form in which two caliper bodies are coupled to the brake disc 10.

According to the present disclosure, to simplify the configuration and reduce the number of parts, the brake pad part 120 of the main braking brake 150 may also be used for parking, and thus the main braking brake 150 and the parking brake 160 may be integrated into each other.

However, the parking piston 164 and a motor 165 are located on one side (in a rear direction), the parking brake 160 may be applied only to the sliding caliper brake that is to be moved on the brake disc 10.

Although preference for the opposed caliper brake increases due to braking power and appearance, it is difficult to implement a parking brake integrally with the opposite main braking brake, and thus there is a limitation in that two caliper bodies need to be installed separately.

The present disclosure may provide a main braking/parking integrated brake device by adding the slidable parking caliper body 161 to the main braking caliper body 110 to integrally implement the electronic parking brake 160 in the opposed caliper brake system.

As shown in FIG. 3, the main braking brake 150 may include a first main braking piston 126 and a second main braking piston 127 that pressurize one pair of brake pads 121 and 122, respectively. The first main braking piston 126 may be positioned in contact with a second surface of the first brake pad 121 and the second main braking piston 127 may be positioned in contact with a second surface of the second brake pad 122.

The first main braking piston 126 and the second main braking piston 127 may move symmetrically and simultaneously, and simultaneously move the first brake pad 121 and the second brake pad 122 in a direction of the brake disc 10. In this case, the position of the main braking caliper body 110 with respect to the brake disc 10 may not change.

A pair of the first main braking piston 126 and the second main braking piston 127 may each be provided in a horizontal direction (y-axis direction) to uniformly apply a force to a long brake pad in a horizontal direction to increase braking force.

Figure 4:
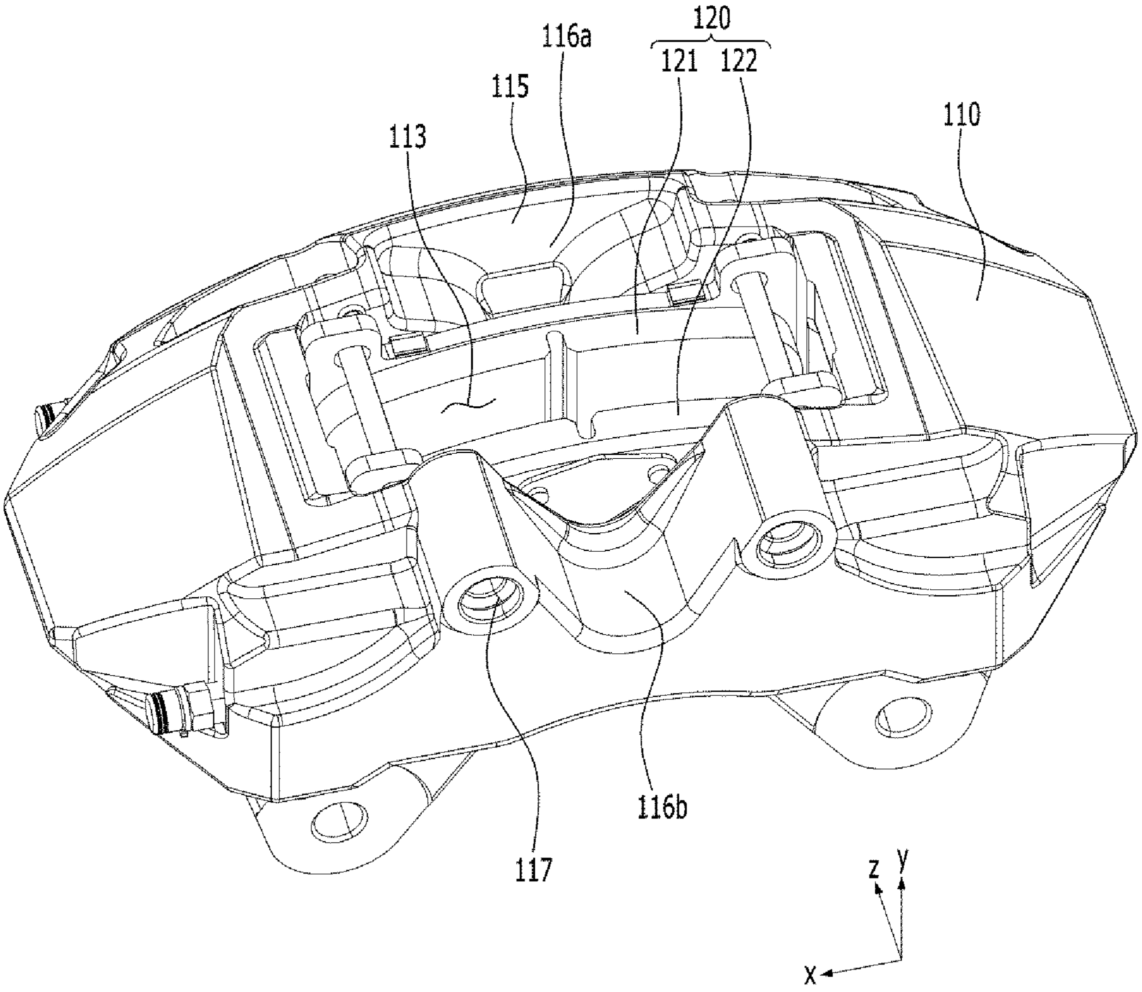
FIG. 4 is a perspective view showing a main braking caliper body of a brake device according to any one of embodiments of the present disclosure.

FIG. 4 is a perspective view showing the main braking caliper body 110 from which the parking caliper body 161 of the brake device 100 is separated according to any one of embodiments of the present disclosure. A general opposed caliper body may have a closed top, but the main braking caliper body 110 according to the present disclosure may be opened at the top to connect the parking caliper body 161.

The main braking caliper body 110 may include a first caliper body positioned at the front and a second caliper body positioned at the rear, and the brake pad part 120 may be disposed in the internal space 113 formed between the first caliper body and the second caliper body. A lower portion of the inner space of the main braking caliper body 110 may be opened to insert the brake disc 10 thereinto, and an upper portion may be opened to couple the parking brake 160 thereto as described above.

An accommodation part 116 may be formed in the main braking caliper body 110 to accommodate the parking caliper body 161 thereon, and may include a first accommodation part 116*a* formed in the first caliper body and a second accommodation part 116*b* formed in the second caliper body. In both the first accommodation part 116*a* and the second accommodation part 116*b*, an upper surface part is open, and the second surface of the brake pad part 120 may be partially exposed.

Figure 5:
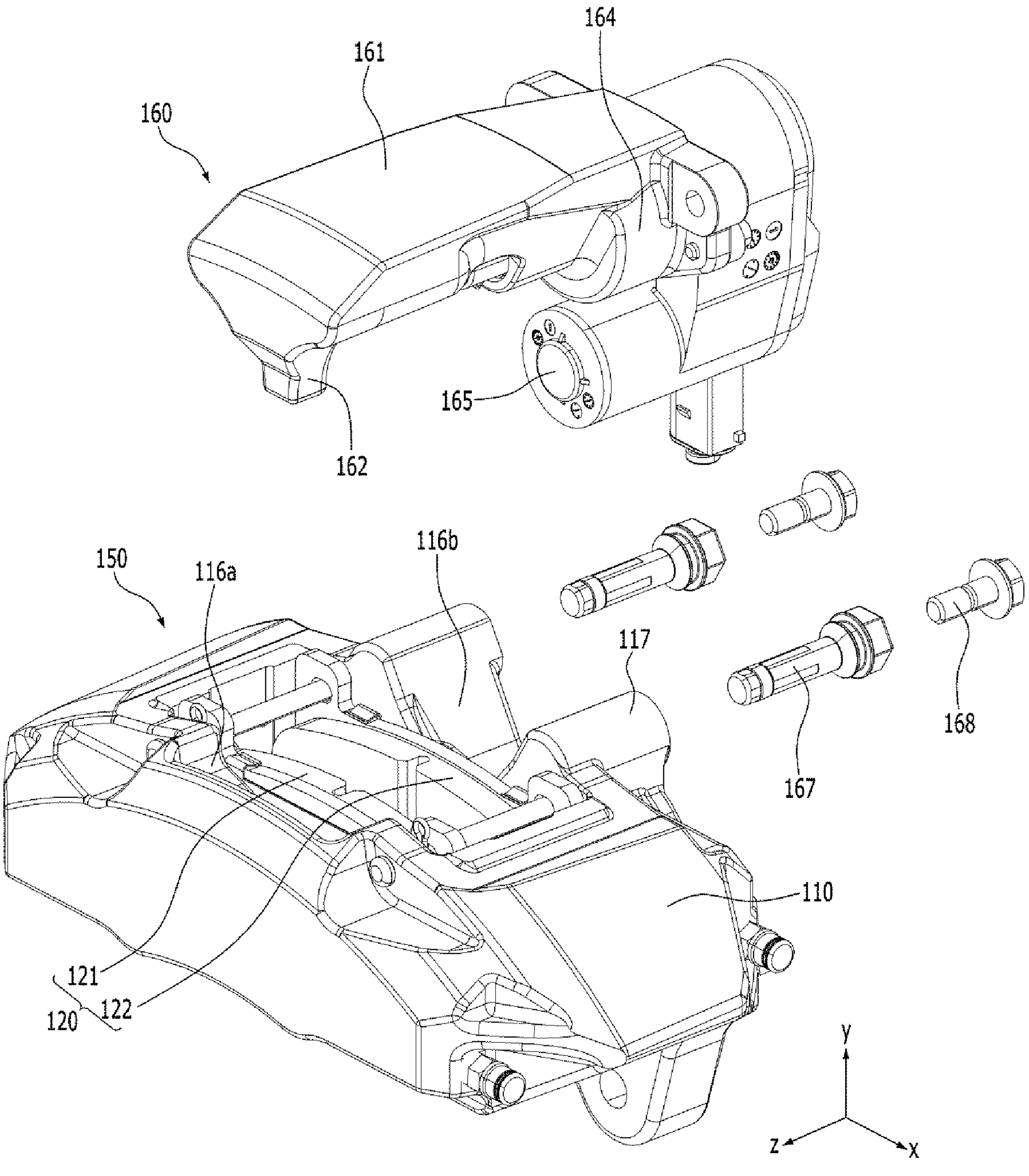
FIG. 5 is an exploded perspective view of the brake device 100 according to any one of embodiments of the present disclosure.

FIG. 5 is an exploded perspective view of the brake device 100 according to any one of embodiments of the present disclosure. The parking caliper body 161 may be located on an upper surface of the main braking caliper body 110 and may extend in forward and backward directions.

The motor 165 and the parking piston 164 may be located in a rear direction of the main braking caliper body 110, the parking piston 164 may be located on the second accommodation part 116*b* formed in the second caliper body, and the motor 165 may be located at the rear of the main braking caliper body 110.

The parking piston 164 may be located at the center of the horizontal direction (y-axis direction) of the brake pad part 120, and may be located at the center of one pair of main braking pistons 126 and 127 arranged in a horizontal direction.

Since the parking caliper body 161 is coupled to an upper side of the main braking caliper body 110, the parking piston 164 may be positioned slightly above the main braking pistons 126 and 127.

The front of the parking caliper body 161 may include a locking part 162 in contact with the second surface of the first brake pad 121, and may be inserted into the first accommodation part 116*a* formed in the first body.

The parking caliper body 161 may be slidably coupled to the main braking caliper body 110. The parking caliper body 161 may be coupled to the main braking caliper body 110 through a guide rod 167 inserted into a guide hole 117 formed in the main braking caliper body 110 in such a way that the parking piston 164 moves in a direction in which the parking piston 164 moves, that is, in a direction in which the brake pad part 120 moves.

The guide hole 117 may extend in forward and backward directions of the main braking caliper body 110, that is, parallel to a direction in which the parking piston 164 moves, and the guide rod 167 may slide within the guide hole 117.

When the guide rod 167 is integrally configured with the parking caliper body 161, it may be difficult to couple the parking caliper body 161 to the main braking caliper body 110, and thus after the guide rod 167 is inserted into the guide hole 117, the locking part 162 and the parking piston 164 of the parking caliper body 161 may be coupled to the accommodation part 116 to be accommodated thereon.

Then, the guide rod 167 and the parking caliper body 161 may be coupled to each other through an assembly bolt 168 to assemble the guide rod 167 and the parking caliper body 161. The parking caliper body 161 may be coupled to the main braking caliper body 110 to allow movement in the z-axis direction (forward and backward movement) and limit movement in other directions.

Figure 6:
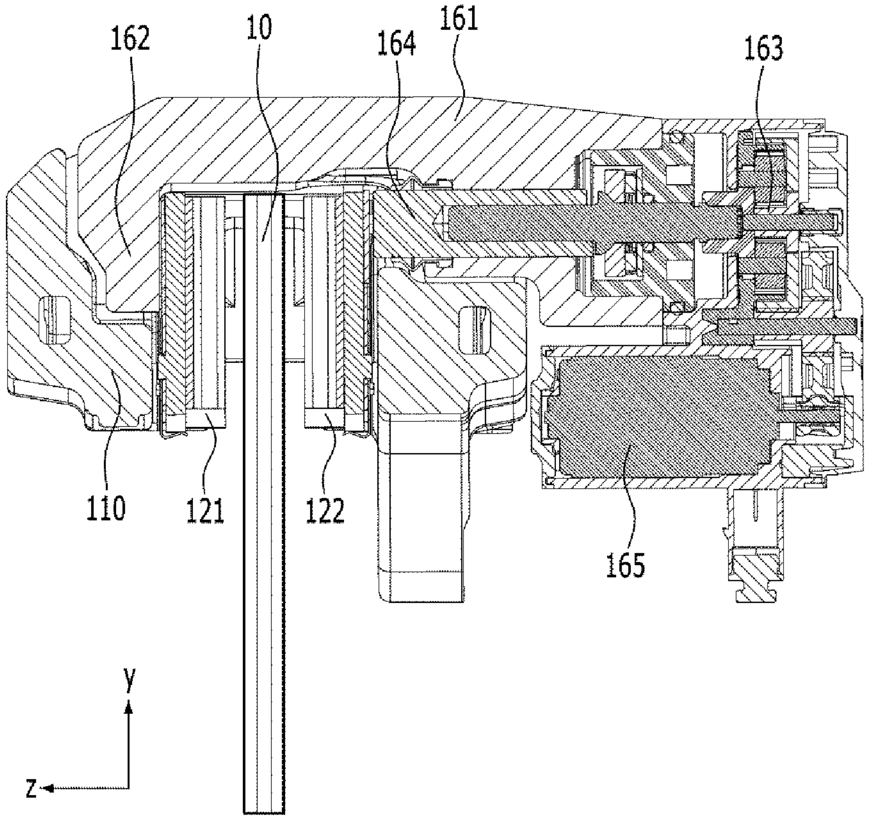
FIGS. 6 and 7 are a cross-sectional view taken along B-B of FIG. 2.
Figure 7:
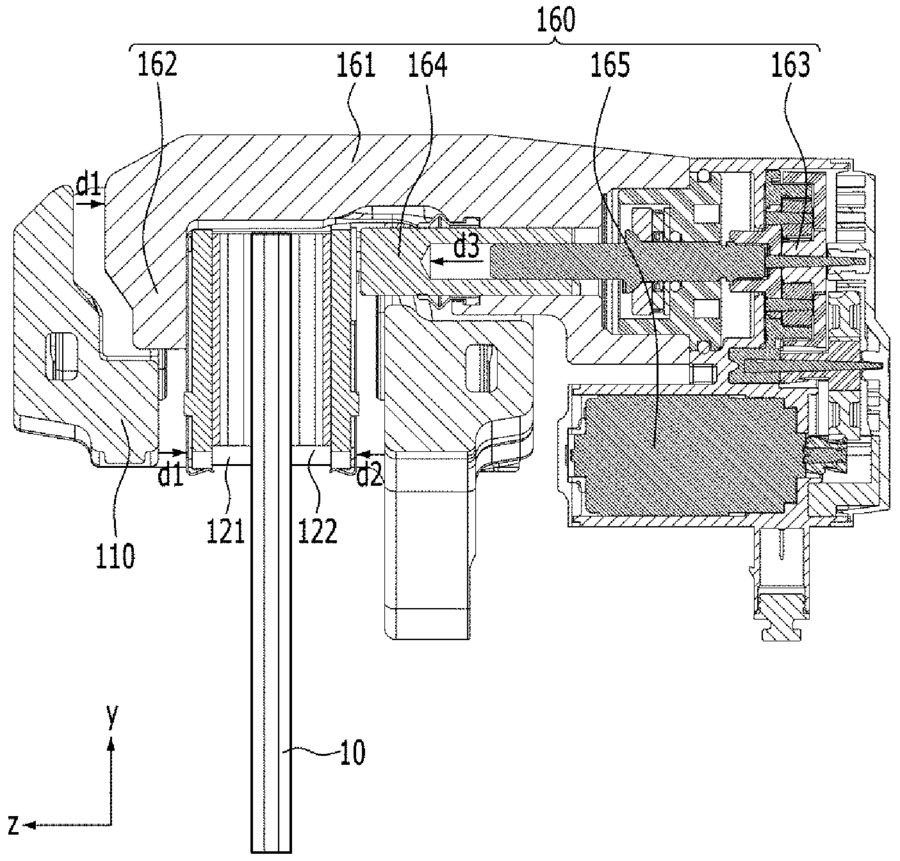
Figure 8:
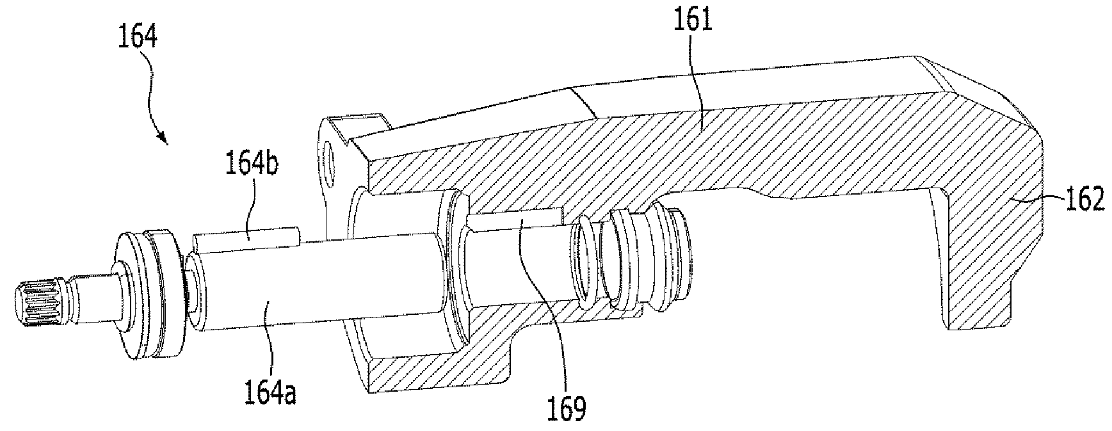
FIG. 8 is a perspective view showing a parking piston mounted in a parking caliper body in a brake device according to one of embodiments of the present disclosure.
Figure 8:
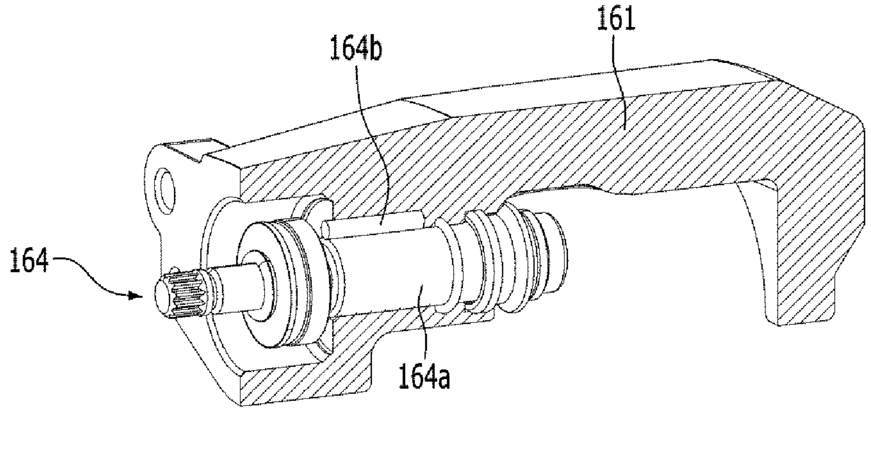
Figure 9:
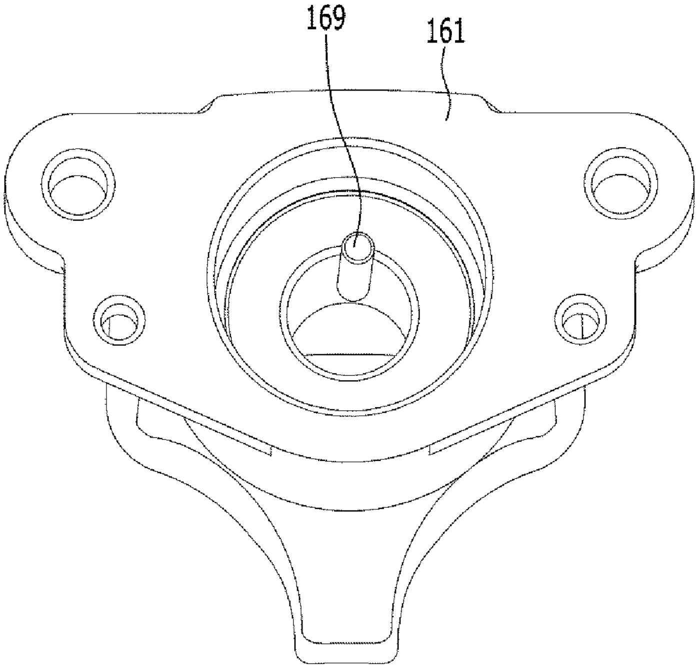
FIG. 9 is a perspective view showing a parking caliper body including a rotation preventing groove defined therein in a brake device according to one of embodiments of the present disclosure.
Figure 10:
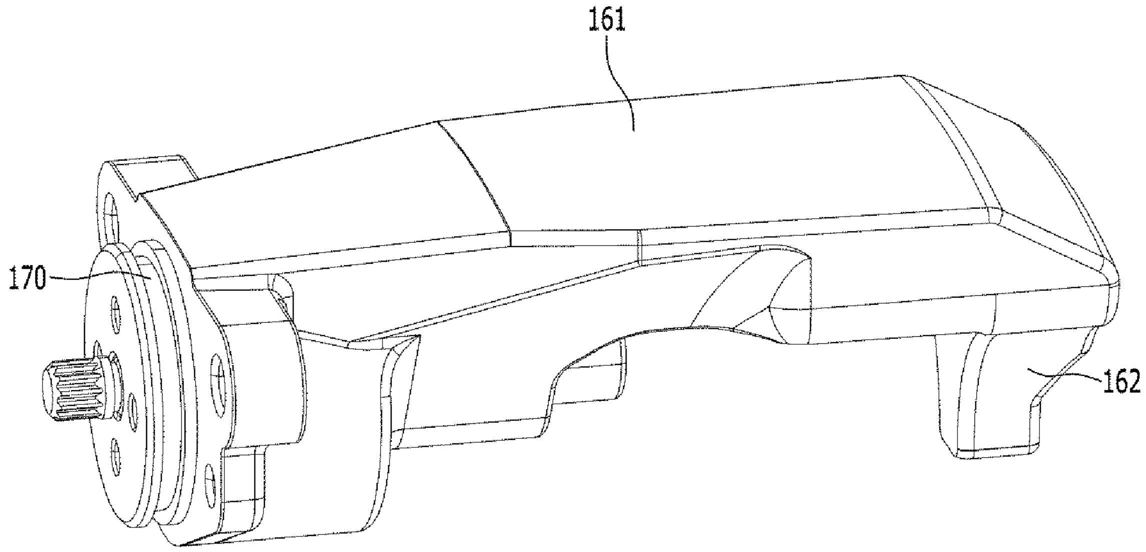
FIG. 10 is a perspective view showing a parking caliper body including a guide plate in a brake device according to one of embodiments of the present disclosure.

FIGS. 6 and 7 are cross-sectional views taken along a line B-B in FIG. 2. FIG. 8 is a perspective view showing the parking piston 164 disposed at or mounted in the parking caliper body 161 in the brake device 100 according to one of embodiments of the present disclosure. FIG. 9 is a perspective view showing the parking caliper body 161 including a rotation- preventing groove 169 defined therein in the brake device 100 according to one of embodiments of the present disclosure. In addition, FIG. 10 is a perspective view showing the parking caliper body 161 including a guide plate 170 in the brake device 100 according to one of embodiments of the present disclosure.

FIG. 6 is a cross-sectional view taken along the line B-B in FIG. 2. A state in which the parking brake 160 is coupled to the main braking brake 150 may be identified from the drawing. The second accommodation part 116*b* may be opened in a front and rear direction, so that the second surface of the second brake pad 122 may be exposed at the front and a shaft of the parking piston 164 may be extended at the rear.

Because the motor 165 and the parking piston 164 are arranged in a vertical direction in parallel with each other, the plurality of pinion gears 163 for transmitting a driving force of the motor 165 may be arranged.

FIG. 8 is the perspective view showing the parking piston 164 mounted in the parking caliper body 161 in the brake device 100 according to one of the embodiments of the present disclosure. (a) in FIG. 8 is a view showing a state before the parking piston 164 is mounted in the parking caliper body 161, and (b) in FIG. 8 is a view showing a state after the parking piston 164 is mounted in the parking caliper body 161.

As shown in FIG. 8, in the brake device 100 according to one embodiment of the present disclosure, the parking piston 164 may include a piston shaft 164*a* that receives the driving force of the motor 165 and configured to rectilinearly move forward or backward toward or away from the second brake pad 122, and a guide pin 164*b* that is coupled to and protrude from a top surface of the piston shaft 164*a*.

In addition, FIG. 9 is the perspective view showing the parking caliper body 161 including the rotation-preventing groove 169 defined therein in the brake device 100 according to one of embodiments of the present disclosure. As shown in FIG. 9, in the brake device 100 according to one embodiment of the present disclosure, the parking caliper body 161 may include the rotation-preventing groove 169 into which the guide pin 164*b* is inserted and preventing rotation of the piston shaft 164*a* when the parking piston 164 is driven.

As described above, because the parking brake 160 is away from the brake disc 10 during the braking of the vehicle, a bolt was conventionally fastened to control the rotation of the screw. However, the control of the rotation of the screw via the bolt had a problem of causing a deformation of the bolt, causing a failure of the parking brake 160. Additionally, because the bolt is inserted via processing from the outside of the parking caliper body 161, there was a limitation in that a separate member for watertightness is required.

Accordingly, in the present disclosure, to solve the above problem, the guide pin 164*b* is coupled to the top surface of the piston shaft 164*a*, and the guide pin 164*b* is inserted into the rotation-preventing groove 169 of the parking caliper body 161, thereby preventing the rotation of the piston shaft 164*a*.

In addition, accordingly, not only it is possible to prepare for the failure of the parking brake 160 by effectively preventing the rotation of the piston shaft 164*a* during the driving of the parking piston 164, but also the need for the additional member for the watertightness is eliminated because the external processing of the parking caliper body 161 is not required.

In addition, FIG. 10 is the perspective view showing the parking caliper body 161 including the guide plate 170 in the brake device 100 according to one of embodiments of the present disclosure. Referring to FIGS. 8 and 9 together, the brake device 100 according to one embodiment of the present disclosure may further include the guide plate 170 coupled to the parking caliper body 161 and guiding the forward or backward movement of the piston shaft 164*a*. In addition, the guide plate 170 allows the piston shaft 164*a* to move only forward or backward, allowing a parking force to be fully transmitted after the vehicle is stopped.

The parking piston 164 is in contact with the second surface of the second brake pad 122, and the locking part 162 of the parking caliper body 161 is in contact with the second surface of the first brake pad 121. An upper portion that connects the locking portion 162 and the parking piston 164 to each other extends in the front and rear direction across the pair of brake pads 120 from above.

FIG. 7 is a diagram illustrating a state in which the parking piston 164 operates and the brake pad 120 pressurizes the brake disc 10 in FIG. 6.

The parking piston 164 becomes longer and applies a force in the z-axis direction, that is, in a forward direction to press the second brake pad 122 and move the second brake pad 122 in a direction of the brake disc 10. In this regard, when the second brake pad 122 comes into contact with the brake disc 10, the parking caliper body 161 moves in a rearward direction and moves the first brake pad 121 in a direction of the brake disc 10.

The second brake pad 122 and the first brake pad 121 may be moved at the same time, or the first brake pad 121 may be moved after the second brake pad 122 is moved, as described above.

When the parking piston 164 is extended, the parking piston 164 pressurizes the second brake pad 122, and at the same time, pushes the parking caliper body 161 in a opposite direction to an extension direction of the parking piston 164 (action and reaction) to pressurize the first brake pad 121.

An extension length d3 of the parking piston 164 corresponds to a sum of a movement distance dl of the first brake pad 121 and a movement distance d2 of the second brake pad 122, and the movement distance of the first brake pad 121 is equal to the movement of the parking caliper body 161.

The main braking caliper body 110 is an opposed caliper brake, and a location thereof relative to the brake disc 10 in the z-axis direction (the front and rear direction) is always the same. However, during the parking, the parking caliper body 161 pressurizes the brake pad 120 while changing in a location thereof relative to the main braking caliper body 110 and the brake disc 10.

The operation of the parking caliper body 161 is in a slide caliper scheme. The brake device 100 according to the present disclosure may improve a braking performance using the opposed caliper scheme for the main braking, and at the same time, realize the electronic parking brake driven in the slide caliper scheme using one brake pad 120.

The brake device 100 according to the present disclosure may realize, using one brake pad 120, the electronic parking brake driven in the slide caliper scheme while, at the same time, improving a braking performance by using the opposed caliper scheme for the main braking.

As the main braking caliper body 110 is used as a torque member of the parking caliper body 161, the parking caliper body 161 may be slidable, and the main braking brake 150 and parking brake 160 may be easily assembled with and disassembled from each other. The detailed description of the exemplary embodiments of the present disclosure disclosed as described above is provided to enable those skilled in the art to make and practice the present disclosure. Although the above has been described with reference to exemplary embodiments of the present disclosure, it will be understood by those skilled in the art that various modifications and changes are made to the present disclosure without departing from the scope of the present disclosure.

What is claimed is:

1. A brake device comprising:

a main braking caliper body including a first main braking piston and a second main braking piston spaced apart from and facing toward each other;

a brake pad disposed between the first main braking piston and the second main braking piston and including:

a first brake pad having a first surface and a second surface respectively facing in mutually opposed directions, wherein the first main braking piston is in contact with and configured to press the second surface of the first brake pad; and a second brake pad having a first surface and a second surface respectively facing in mutually opposed directions, wherein the first surface of the second brake pad is facing the first surface of the first brake pad, and the second main braking piston is in contact with and configured to press the second surface of the second brake pad;

a parking caliper body coupled to the main braking caliper body and including a locking part engaged with the second surface of the first brake pad; and a parking piston disposed at the parking caliper body and configured to press the second surface of the second brake pad, wherein the parking piston includes:

a piston shaft configured to rectilinearly move toward and away from the second brake pad; and a guide pin protruding from a top surface of the piston shaft.

2. The brake device of claim 1, wherein the parking caliper body includes a rotation-preventing groove into which the guide pin is inserted, the parking caliper body configured to prevent rotation of the piston shaft when the parking piston is driven.

3. The brake device of claim 2, further comprising a guide plate coupled to the parking caliper body and configured to guide rectilinear movement of the piston shaft.

4. The brake device of claim 1, wherein the locking part of the parking caliper body is configured to move the first brake pad toward the second brake pad when the parking piston presses the second brake pad.

5. The brake device of claim 4, wherein the parking piston has an extension length corresponding to a sum of a movement distance of the second brake pad and a movement distance of the parking caliper body.

6. The brake device of claim 1, wherein the main braking caliper body includes:

a first accommodation part disposed on the second surface of the first brake pad, wherein the locking part of the parking caliper body is inserted into the first accommodation part; and a second accommodation part disposed on the second surface of the second brake pad.

7. The brake device of claim 6, wherein:

the main braking caliper body includes a top surface having an opening exposing an upper portion of the brake pad, and the parking caliper body includes an upper portion covering at least a portion of the top surface of the main braking caliper body and connecting the locking part and the parking piston to each other.

8. The brake device of claim 1, wherein:

the main braking caliper body has a guide hole extending in a direction parallel to a moving direction of the parking piston, the parking caliper body includes a guide rod inserted into the guide hole, and the guide rod is configured to slide along the guide hole when the parking piston is driven.

9. A vehicle comprising:

a vehicle body;

a rotatable wheel;

a brake disc coupled to the rotatable wheel and configured to rotate together with the rotatable wheel;

a main braking caliper body, into which an end of the brake disc is inserted, the main braking caliper body including a first main braking piston and a second main braking piston spaced apart from and facing toward each other;

a brake pad disposed between the first main braking piston and the second main braking piston and including:

a first brake pad having a first surface and a second surface respectively facing in mutually opposed directions, wherein the first main braking piston is in contact with and configured to press the second surface of the first brake pad; and a second brake pad having a first surface and a second surface respectively facing in mutually opposed directions, wherein the first surface of the second brake pad is facing toward the first surface of the first brake pad, and the second main braking piston is in contact with and configured to press the second surface of the second brake pad;

a parking caliper body coupled to the main braking caliper body and including a locking part engaged with the second surface of the first brake pad; and a parking piston disposed at the parking caliper body and configured to press the second surface of the second brake pad, wherein the parking piston includes:

a piston shaft configured to rectilinearly move toward and away from the second brake pad; and a guide pin protruding from a top surface of the piston shaft.

10. The vehicle of claim 9, wherein the parking caliper body includes a rotation-preventing groove, into which the guide pin is inserted, the rotation-preventing groove configured to prevent rotation of the piston shaft when the parking piston is driven.

* * * * *